(12) United States Patent
Yoo et al.

(10) Patent No.: US 10,459,489 B2
(45) Date of Patent: Oct. 29, 2019

(54) DISPLAY PANEL AND DISPLAY APPARATUS INCLUDING THE SAME

(71) Applicant: Samsung Display Co., Ltd., Yongin-Si, Gyeonggi-Do (KR)

(72) Inventors: Bugyoon Yoo, Daegu (KR); Kyuhan Bae, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 147 days.

(21) Appl. No.: 15/597,268

(22) Filed: May 17, 2017

(65) Prior Publication Data
US 2018/0011514 A1    Jan. 11, 2018

(30) Foreign Application Priority Data

Jul. 11, 2016   (KR) ........................ 10-2016-0087627

(51) Int. Cl.
*G06F 1/16* (2006.01)

(52) U.S. Cl.
CPC ................................ *G06F 1/1652* (2013.01)

(58) Field of Classification Search
CPC ...... H05K 1/028; H05K 1/0298; H05K 1/147; H05K 1/148; G06F 1/1652; H01L 51/0097
See application file for complete search history.

(56) References Cited

U.S. PATENT DOCUMENTS

| | | | | |
|---|---|---|---|---|
| 5,153,705 A * | 10/1992 | Fukuta | ............... | H01L 23/4985 257/668 |
| 2013/0148312 A1* | 6/2013 | Han | ........................ | H05K 7/00 361/736 |
| 2015/0173171 A1* | 6/2015 | Kim | ....................... | H05K 1/028 361/749 |
| 2015/0189768 A1* | 7/2015 | Kishida | .................. | H05K 1/028 361/749 |
| 2015/0382446 A1* | 12/2015 | Kwon | .................... | H05K 1/028 174/251 |
| 2016/0195901 A1* | 7/2016 | Kauhaniemi | ......... | G06F 1/1652 361/679.27 |

(Continued)

FOREIGN PATENT DOCUMENTS

| | | |
|---|---|---|
| KR | 1020080086268 A | 9/2008 |
| KR | 1020140083252 A | 7/2014 |

(Continued)

*Primary Examiner* — Hoa C Nguyen
*Assistant Examiner* — Christopher L Augustin
(74) *Attorney, Agent, or Firm* — Cantor Colburn LLP

(57) ABSTRACT

A display panel includes a first portion including a display area; a second portion adjacent to the first portion in a first direction; and a bendable portion connecting the first and second portions and at which the display panel is bent about a bending axis extending in a second direction perpendicular to the first direction. The bendable portion includes: a stress concentration portion to which a stress is applied; and first and second stress generation portions at opposing sides of the stress concentration portion in the first direction, and to which stress is applied less than that applied to the stress concentration portion. Each of the first and second stress generation portions defines a second width in the second direction, the stress concentration portion defines a third width in the second direction less than the second width, and the second width is less than the first width.

20 Claims, 11 Drawing Sheets

(56) References Cited

U.S. PATENT DOCUMENTS

2016/0322724 A1* 11/2016 Lee ...................... H01R 12/771
2017/0170206 A1*  6/2017 Lee ...................... H01L 27/1218

FOREIGN PATENT DOCUMENTS

| KR | 101451553 B1 | 10/2014 |
| KR | 1020150062237 A | 6/2015 |
| KR | 1020150094989 A | 8/2015 |
| KR | 1020150137186 A | 12/2015 |

\* cited by examiner

DISPLAY PANEL AND DISPLAY APPARATUS INCLUDING THE SAME

This application claims priority to Korean Patent Application No. 10-2016-0087627, filed on Jul. 11, 2016, and all the benefits accruing therefrom under 35 U.S.C. § 119, the content of which in its entirety is herein incorporated by reference.

BACKGROUND

(1) Field

The invention disclosed herein relates to a display panel and a display apparatus including the same, and more particularly, to a display panel having improved durability and bending characteristics, and a display apparatus including the same.

(2) Description of the Related Art

As an information society is developed, display apparatuses for displaying an image such as electronic devices including mobile communication terminals, digital cameras, laptop computers, monitors and televisions are being developed in various types. Particularly, to improve a user's convenience, the display apparatuses having a relatively smaller size and lighter weight are being developed.

As a measure for this trend, flexible display apparatuses that are foldable or bendable are actively being developed in various types. In addition, ways for more improving bending strength and flexibility of the flexible display apparatuses are being requested.

SUMMARY

One or more embodiment of the invention provides a display panel having improved durability and bending characteristics.

An embodiment of the invention provides a display panel including: a first portion including a display area in which a plurality of display pixels are disposed; a second portion disposed adjacent to the first portion in a first direction; and a bendable portion which connects the first portion to the second portion and at which the display panel is bent about a bending axis extending in a second direction which is perpendicular to the first direction. With the display panel bent about the bending axis, the bendable portion includes: a stress concentration portion to which a stress is applied; and first and second stress generation portions disposed at opposing sides of the stress concentration portion in the first direction, and to which stress is applied less than that applied to the stress concentration portion. The first portion defines a first width in the second direction, each of the first and second stress generation portions defines a second width in the second direction, the stress concentration portion defines a third width in the second direction, and the third width is less than the second width, and the second width is less than the first width.

In an embodiment, the display panel may include a pad portion disposed on the second portion and connected to the plurality of pixels of the first portion.

In an embodiment, with the display panel bent about the bending axis, the second portion may overlap the first portion.

In an embodiment, the display panel bent about the bending axis may define a radius of curvature of the bendable portion. A length of the stress concentration portion of the bendable portion in the first direction may be proportional to the radius of curvature of the bendable portion.

In an embodiment, the stress concentration portion of the bendable portion may include an enclosed hole.

In an embodiment, the second portion may define a fourth width in the second direction, and the fourth width may be greater than or equal to the second width defined by the each of the first and second stress generation portions.

In an embodiment, the second portion may define a fourth width in the second direction, and the fourth width may be less than or equal to the second width defined by the each of the first and second stress generation portions and greater than the third width.

In an embodiment, the display panel may further include: a first protection film disposed on the first portion to overlap the first portion; and a second protection film disposed on the second portion to overlap the second portion and spaced apart from the first protection film in the first direction. The bendable portion may be exposed between the first protection film and the second protection film spaced apart from each other in the first direction.

In an embodiment, the first stress generation portion may be between the first portion and the stress concentration portion, and the second stress generation portion may be between the second portion and the stress concentration portion. The display panel may further include: a first protection film commonly disposed on the first portion and the first stress generation portion; and a second protection film commonly disposed on the second portion and the second stress generation portion, and spaced apart from the first protection film in the first direction. The stress concentration portion may be exposed between the first protection film and the second protection film spaced apart from each other in the first direction.

In an embodiment, the second portion and the bendable portion may each be provided in plurality, the plurality of second portions may be spaced apart from each other in the second direction and connected to the plurality of bendable portions in one-to-one correspondence in the first direction, a sum of widths of the plurality of bendable portions in the second direction spaced apart from each other in the second direction may be less than the first width defined by the first portion, and within each bendable portion spaced apart from each other in the second direction, a width of the stress concentration portion in the second direction may be less than that of each of the first and second stress generation portions in the second direction.

An embodiment of the invention provides a display panel including a first portion including a display area in which a plurality of display pixels are disposed; a second portion disposed adjacent to the first portion in a first direction; and a bendable portion which connects the first portion to the second portion, and at which the display panel is bent about a bending axis extending in a second direction which is perpendicular to the first direction. With the display panel bent about the bending axis, the bendable portion includes: a stress concentration portion to which a stress is applied; and first and second stress generation portions disposed at opposing sides of the stress concentration portion in the first direction, and to which stress is applied less than that applied to the stress concentration portion. The first portion defines a first width in the second direction, each of the first and second stress generation portions defines a second width less than the first width in the second direction, and the bendable portion is provided with a stress-reducing member, the stress-reducing member including a first groove provided recessed from each of opposing side surfaces of the stress concentration portion in the second direction.

In an embodiment, an inner surface of each of the first grooves may include a curved surface.

In an embodiment, the stress-reducing member may further include a hole defined in the bendable portion and provided between the first grooves in the stress concentration portion, and the first grooves and the hole may be arranged in the second direction.

In an embodiment, the second portion may have a fourth width greater than or equal to the second width in the second direction.

In an embodiment, the display panel may further include a spacing groove recessed from a distal end of the second portion and toward the first portion in the first direction. The spacing groove may extend from the distal end of the second portion, pass through the second portion and pass through the bendable portion to expose a side surface of the first portion at the spacing groove.

In an embodiment, the first grooves may be provided recessed from each of opposing outer side surfaces of the stress concentration portion in the second direction, and inner side surfaces of the stress concentration portion may face each other across the spacing groove. A plurality of second grooves may be respectively defined at the inner side surfaces of the stress concentration portion at the spacing groove, and each of the second grooves at the inner side surfaces of the stress concentration portion may be arranged in the second direction so as to face the first grooves at a respective outer side surfaces of the stress concentration portion.

An embodiment of the invention provides a display panel including: a window member to which an image is provided and through which the image is viewable; and a display panel which generates and displays the image, and provides the image to the window member. The display panel includes: a first portion including a display area in which a plurality of display pixels are disposed; a second portion disposed adjacent to the first portion in a first direction; and a bendable portion which connects the first portion to the second portion and at which the display panel is bent about a bending axis extending in a second direction which is perpendicular to the first direction. With the display panel bent about the bending axis, the bendable portion includes: a stress concentration portion to which a stress is applied; and first and second stress generation portions disposed at opposing sides of the stress concentration portion in the first direction, and to which stress is applied less than that applied to the stress concentration portion. The first portion defines a first width in the second direction, each of the first and second stress generation portions defines a second width in the second direction, the stress concentration portion defines a third width in the second direction, and the third width is less than the second width, and the second width is less than the first width.

In an embodiment, the display apparatus may further include a pad portion disposed on the second portion and connected to the plurality of pixels of the first portion.

In an embodiment, the display apparatus may further include a printed circuit board disposed under the display panel and electrically connected to the pad portion disposed on the second portion and connected to the plurality of pixels of the first portion.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
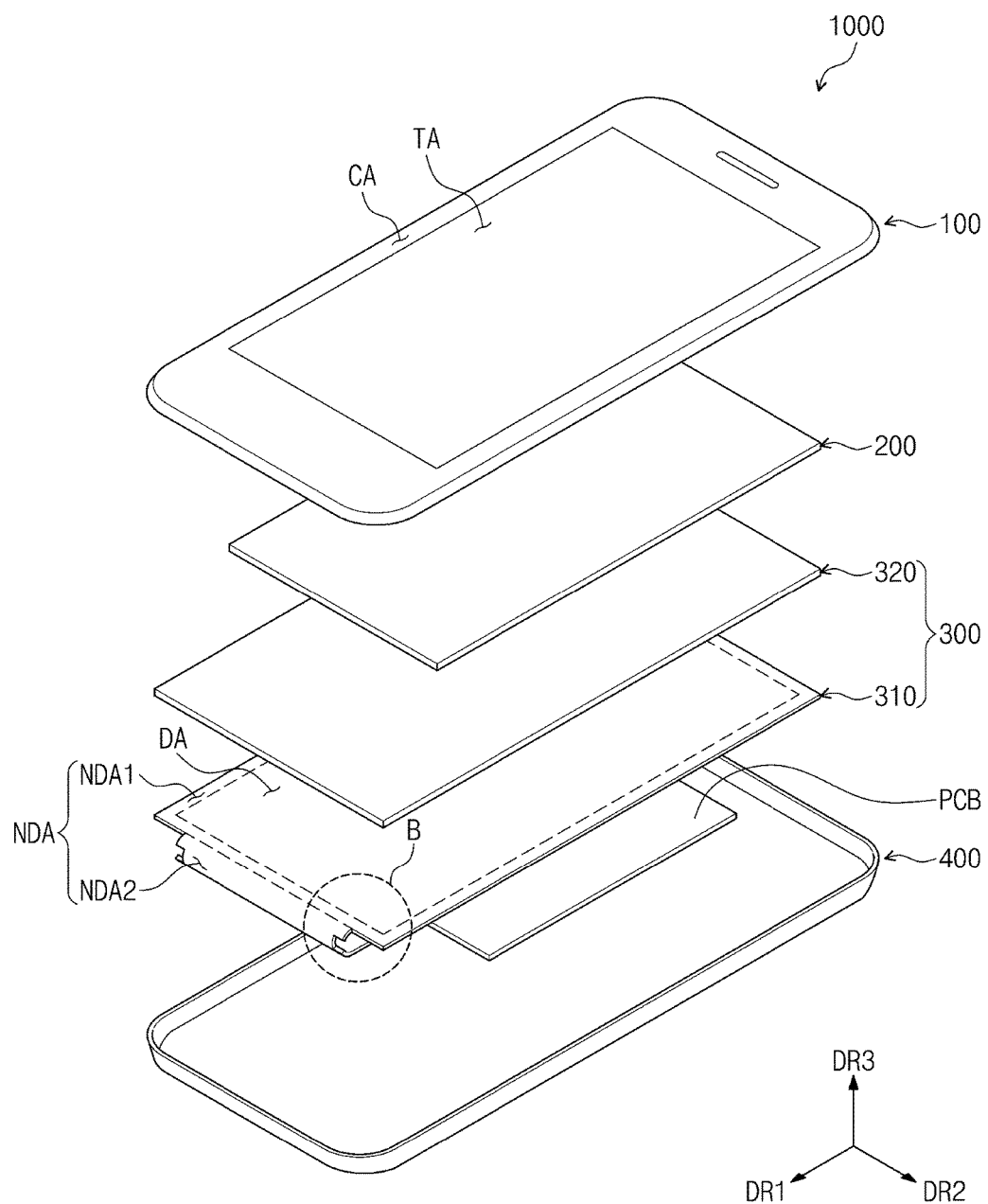
FIG. 1 is an exploded perspective view of an embodiment of a display apparatus according to the invention.

Advantages and features of the present disclosure, and implementation methods thereof will be clarified through following embodiments described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the invention to those skilled in the art. Further, the present disclosure is only defined by scopes of claims. Like reference numerals refer to like elements throughout.

It will also be understood that when an element or layer is referred to as being "on" another element or layer, it can be directly on the other element or layer, or intervening layers may also be present. In contrast, when an element is referred to as being "directly on" another element, there are no intervening elements or layers present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below," "beneath," "lower," "above," "upper," and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the invention.

It will be understood that although the terms of first and second are used herein to describe various elements, components, and/or sections, these elements, components, and/or sections should not be limited by these terms. These terms are only used to distinguish one element, component, or section from another element, component, or section. Accordingly, a first element, a first component, or a first section that will be described below may be a second element, a second component, or a second section within the technical idea of the present disclosure.

The embodiments in the specification will be described with schematic development views and/or plan views as ideal exemplary views of the present disclosure. Accordingly, shapes of the exemplary views may be modified according to manufacturing techniques and/or allowable errors. Therefore, the embodiments of the invention are not limited to the specific shape illustrated in the exemplary views, but may include other shapes that may be created according to manufacturing processes. Thus, areas exemplified in the drawings have general properties, and are used to illustrate a specific shape of a device region. Thus, this should not be construed as limited to the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the invention will be described below in more detail with reference to the accompanying drawings.

FIG. 1 is an exploded perspective view of an exemplary embodiment of a display apparatus according to the invention.

Referring to FIG. 1, a display apparatus 1000 has a long side in a first direction DR1 and a short side in a second direction DR2 which crosses the first direction DR1. The long side has a length greater than that of the short side. However, the invention is not limited to a shape of the display apparatus 1000. In exemplary embodiments, for example, the display apparatus 1000 may have various shapes. The second direction DR2 is defined as a direction that is perpendicular to the first direction DR1.

The display apparatus 1000 includes a window member 100, a polarizing plate 200, a display panel 300 and an accommodation member 400.

A light-transmitting area TA through which an image provided from the display panel 300 is transmitted, and a light-blocking area CA that is adjacent to the light-transmitting area TA and through which the image is not transmitted, are defined by the window member 100. The light-transmitting area TA is defined at a central portion of the display apparatus 100 in the top plan view. The light-blocking area CA is defined at a peripheral portion of the light-transmitting area TA to have a frame shape surrounding the light-transmitting area TA in the top plan view.

According to another embodiment of the invention, only the light-transmitting area TA may be defined by the window member 100 of the display apparatus 1000. An entirety of the window member 100 may transmit light and/or an image therethrough, toward a viewing side of the display apparatus 1000. That is, the light-blocking area CA may be not defined at or by the window member 100. In this case, an image provided from the display panel 300 may be transmitted through an entire top surface of the window member 100.

The window member 100 may include or be formed of a material including glass, sapphire, plastic, and the like.

The polarizing plate 200 is disposed under the window member 100. The polarizing plate 200 may suppress reflection of external light incident to the display apparatus 1000 and serve to change a polarization state of light emitted from the display panel 300 toward an exterior of the display apparatus 1000. In an embodiment of the invention, the polarizing plate 200 may be omitted.

The polarizing plate 200 may be coupled to the window member 100 by an adhesion member (not shown). The adhesion member (not shown) may include polymer resin. In an exemplary embodiment, for example, the adhesion member (not shown) may include light curable resin or thermoplastic resin.

The display panel 300 is disposed under the polarizing plate 200. The display panel 300 may be a flexible display panel 300. As a flexible display panel, at least a portion of the display panel 300 may be configured to be folded or bent in a predetermined direction from an unbent (e.g., flat or planar) state thereof.

The display panel 300 includes a display substrate 310 and an opposite substrate 320. The display panel 300 has an overall shape in which the display substrate 310 and the opposite substrate 320 are bonded to each other. The opposite substrate 320 may have a planar area smaller than that of the display substrate 310.

A display area DA and a non-display area NDA which surrounds the display area DA are defined at or by the display substrate 310. The display area DA may overlap the light-transmitting area TA of the window member 100.

The display substrate 310 generates and displays an image at the display area DA. Although not shown in the drawings, the display substrate 310 may include a plurality of pixels (not shown) at which the image and/or light therefor is generated. The pixels (not shown) receive an electrical signal to form an image which is provided from the display panel 300. The display panel 300 may provide the image to the window member 100 and the provided image may be viewable through the window member 100.

According to characteristics of the display substrate 310, e.g., constituent elements of the pixels, the type of the display panel 300 may be determined. In an exemplary embodiment, for example, the display panel 300 according to the invention may be an organic light emitting display panel. However, the invention is not limited to the kind of the display panel 300 described above. According to another exemplary embodiment of the invention, the display panel 300 may be a liquid crystal display panel, an electrophoretic display panel, an electrowetting display panel, or one of various display panels capable of displaying an image with or without a separate light being provided thereto to generate an image. Accordingly, one or more exemplary embodiment of the display panel 300 according to the invention may include various embodiments and is not limited to one of the embodiments described herein.

The non-display area NDA of the display substrate 310 collectively includes a first non-display area NDA1 and a second non-display area NDA2. The first non-display area NDA1 is defined at a peripheral portion of the display area DA of the display substrate 310. The second non-display area NDA2 is defined at one side of the first non-display area NDA1 of the display substrate 310. A bendable portion of the display substrate 310 may be defined within the second non-display area NDA2. The overall non-display area NDA is described in detail hereinafter with reference to the drawings.

The opposite substrate 320 may serve as an encapsulation substrate that encapsulates the display substrate 310 and elements therein. However, the invention is not limited by the function of the opposite substrate 320. In an exemplary embodiment, for example, according to another exemplary embodiment of the invention, the opposite substrate 320 may have or perform a touch function. Also, according to another exemplary embodiment of the invention, the opposite substrate 320 may be omitted from the display panel 300.

An exemplary embodiment of the display apparatus 1000 according to the invention may further include a printed circuit board PCB. The printed circuit board PCB is disposed under the display panel 300, such as in an assembled state of the display apparatus 1000. The printed circuit board PCB is electrically connected to the display panel 300 to provide an electrical signal to the display panel 300. In an exemplary embodiment, for example, although not shown in the drawing, the printed circuit board PCB may be electrically connected to the display panel 300 through a flexible circuit board (not shown) and/or may provide the electrical signal to the pixels (not shown).

The accommodation member 400 is disposed at the lowermost portion of the display apparatus 1000 and is connected to the window member 100 at the uppermost portion of the display apparatus 1000, to accommodate the polarizing plate 200, the display panel 300 and the printed circuit board PCB therebetween. The accommodation member 400 may include a plastic or a metal. In another exemplary embodiment of the invention, the accommodation member 400 may be omitted from the display apparatus 1000.

Figure 2:
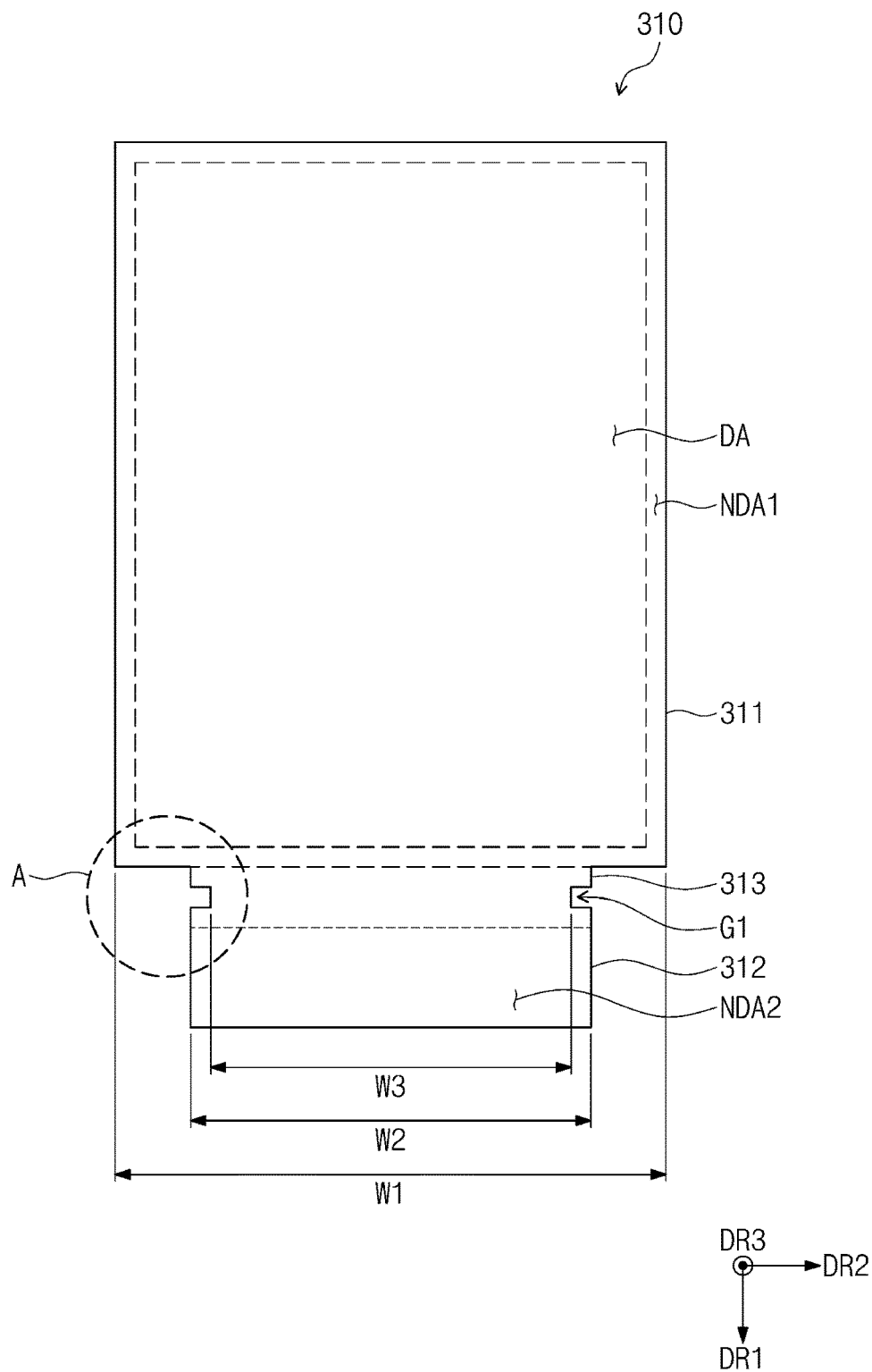
FIG. 2 is a top plan view illustrating a state in which a bendable portion of a display substrate illustrated in FIG. 1 is unfolded (e.g., in flat state)
Figure 3:
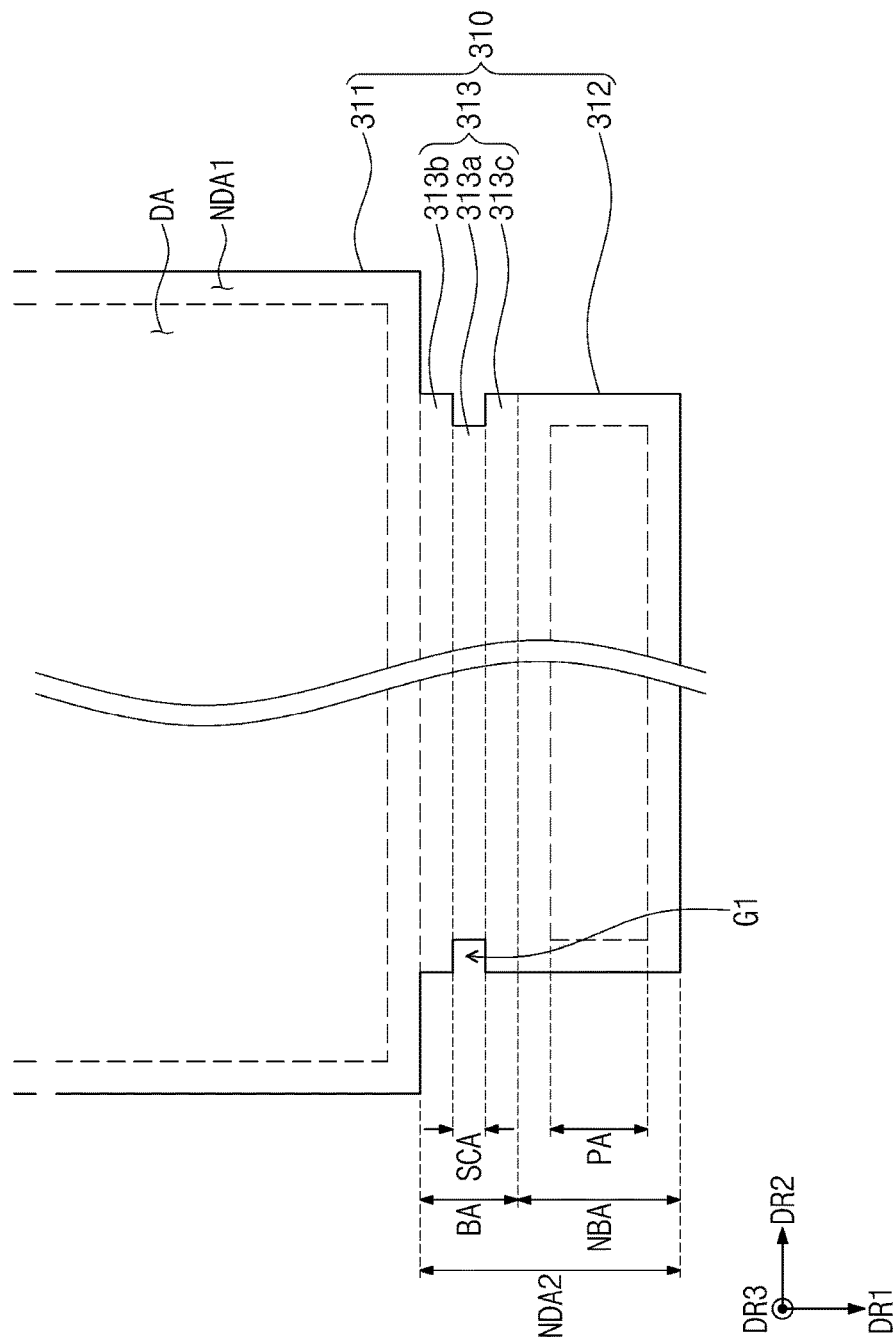
FIG. 3 is an enlarged top plan view of a second non-display area of the display substrate illustrated in FIG. 2.
Figure 4:
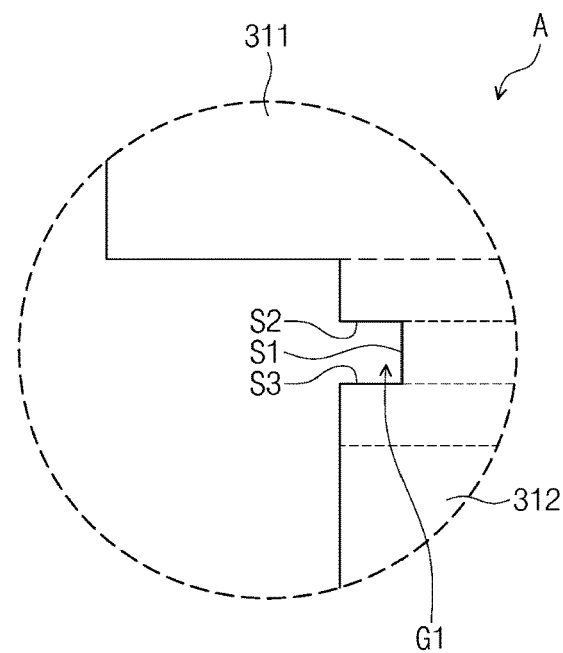
FIG. 4 is an enlarged top plan view of a region A of the display substrate illustrated in FIG. 2.

FIG. 2 is a top plan view in which a bendable portion of the display substrate illustrated in FIG. 1 is unfolded (e.g., in flat state), and FIG. 3 is an enlarged view of the second non-display area of the display substrate illustrated in FIG. 2. FIG. 4 is an enlarged view of a region A of the display substrate illustrated in FIG. 2.

Referring to FIGS. 2 and 3, the display substrate 310 includes or defines a first portion 311, a second portion 312 and a bendable portion 313. The first portion 311 is connected to the second portion 312 with the bendable portion 313 therebetween. The first portion 311, the second portion 312 and the bendable portion 313 are arranged in the first direction DR1 in the unfolded state of the display substrate 310. The first through third portions 311 to 313 may form an entirety of the display substrate 310, and are portions of single, unitary display substrate 310. One among the first through third portions 311 to 313 may extend to define another one among the first through third portions 311 to 313.

The display area DA and the first non-display area NDA1 are defined at the first portion 311. The planar area of the opposite substrate 320 may correspond to that of the first portion 311 of the display substrate 310. The display area DA and the first non-display area NDA1 may define the first portion 311, or vice versa. The first portion 311 may include an entire width of the display substrate 310 in the second direction DR2, taken along a dimension of the display substrate 310 in the first direction DR1. The display area DA defined at or defining the first portion 311 is disposed at a central area of the first portion 311 in a plane. The plane is a plane defined by or parallel to a plane defined by the first direction DR1 and the second direction DR2. The first non-display area NDA1 defined at the first portion 311 has a frame shape surrounding the display area DA in the top plan view.

A plurality of pixels (not shown) are disposed at the display area DA of the first portion 311. Each of the pixels (not shown) may include an organic light emitting device (not shown) including a light emitting material and transistors (not shown) that drive the organic light emitting device. A color generated in the organic light emitting device may include a red, a green, a blue and a white color, but is not limited thereto. An image may be generated at the display area DA by the pixels including the organic light emitting device and the transistors.

The second non-display area NDA2 is defined at the second portion 312 and the bendable portion 313. The second non-display area NDA2 may define the second portion 312 and the bendable portion 313, or vice versa. The second portion 312 and the bendable portion 313 may each respectively include an entire width of the display substrate 310 in the second direction DR2, taken along a dimension of the display substrate 310 in the first direction DR1. The second non-display area NDA2 is connected to one side of the first non-display area NDA1 in the first direction DR1.

The second non-display area NDA2 includes a non-bent (non-bending) area NBA and a bent (bending) area BA. The non-bent area NBA is defined at the second portion 312, and the bent area BA is defined at the bendable portion 313. The bent area BA and the non-bent area NBA are arranged in the first direction DR1 from the first portion 311. The bent area BA connects the non-bent area NBA and the first non-display area NDA1 to each other.

The non-bent area BA of the second portion 312 includes a pad area PA. A pad portion (not shown) may be disposed on the second portion 312 overlapping or at the pad area PA. The pad portion (not shown) may include a plurality of conductive or signal lines which may transmit electrical signals therethrough, a plurality of driving devices which may generate or provide the electrical signals, and a plurality of driving chips which may generate or provide the electrical signals. The pad portion (not shown) may be connected to the pixels (not shown).

The bendable portion includes a stress concentration portion 313a, a first stress generation portion 313b and a second stress generation portion 313c. The stress concentration portion 313a may be disposed between the first stress generation portion 313b and the second stress generation portion 313c. An area of the bendable portion 313, at which the stress concentration portion 313a is disposed, may be defined as a stress concentration area SCA.

The first stress generation portion 313b, the stress concentration portion 313a and the second stress generation portion 313c are connected to each other, and are arranged in the first direction DR1. Particularly, the first stress generation portion 313b is disposed between the stress concentration portion 313a and the first portion 311 to connect the stress generation portion 313a and the first portion 311 to each other. The second stress generation portion 313b is disposed between the stress concentration portion 313a and the second portion 312 to connect the stress concentration portion 313a and the second portion 312 to each other.

According to an exemplary embodiment of the invention, the first portion 311 may have a first width W1 in the second direction DR2. Also, each of the first and second stress generation portions 313b and 313c has a second width W2 in the second direction DR2, and the stress concentration portion 313a has a third width W3 in the second direction DR2. The second portion 312 has a fourth width (not shown) in the second direction DR2.

The second width W2 may be less than the first width W1. That is, each of the first and second stress generation portions 313b and 313c has a width less than that of the first portion 311. Thus, a portion of one side or surface of the first portion 311 may be exposed in the first direction DR1 by the first stress generation portion 313b. The exposed one side or surface of the first portion 311 is connected to or common with one side or surface of the first stress generation portion 313b in the second direction DR2.

According to an exemplary embodiment, the fourth width (not shown) is the same as the second width W2. That is, the second portion 312 has the same width as the first and second stress generation portions 313b and 313c in the second direction DR2. Thus, a portion of one side or surface of the second portion 312 may not be exposed in the first direction DR1 by the second stress generation portion 313c.

Also, the third width W3 may be less than the second width W2. That is, the stress concentration portion 313a has a width less than that of each of the first and second stress generation portions 313b and 313c. Thus, a portion of one side or surface of the first stress generation portion 313b and a portion of one side or surface of the second stress generation portion 313c may be exposed by the stress concentration portion 313a.

In the top plan view, a groove may be defined at each of opposing sides of the bendable portion 313 in the second direction DR2 by the exposed portions of the one side or surface of the first stress generation portion 313b, the exposed portions of the one side or surface of the second stress generation portion 313c, and the exposed portions of opposing sides or surfaces of the stress concentration portion 313a in the second direction DR2.

As the stress concentration portion 313a having the third width W3 less than the second width W2 of each of the first stress generation portion 313b and the second stress generation portion 313c is disposed between the first stress generation portion 313b and the second stress generation portion 313c, a first groove G1 may be provided in plurality at opposing sides of the bendable portion 313 in the second direction DR2. The first groove G1 is recessed inward from an outer edge of the bendable portion 313. The groove G1 may be otherwise referred to as a stress-reduction member.

Inner surfaces of the first groove G1 may include a first surface S1 defined as one surface of the stress concentration portion 313a, a second surface S2 defined as a portion of one surface of the first stress generation portion 313b exposed by the stress concentration portion 313a, and a third surface S3 defined as a portion of one surface of the second stress generation portion 313c exposed by the stress concentration portion 313a. Here, the second surface S2 and the third surface S3 face each other in parallel and are connected to each other by the first surface S1. The first to third surfaces S1 to S3 have a planar dimension extending in the first or second direction DR1 or DR2, as seen in the top plan view. The first to third surfaces S1 to S3 may further extend in a third (e.g., thickness) direction DR3, to be disposed in a plane. The plane in which the first to third surfaces S1 to S3 are respectively disposed may be defined by the first or second direction DR1 or DR2, and the third direction DR3.

According to an exemplary embodiment, the third surface S3 has the same length as the second surface S2 in the second direction DR2, but the invention is not limited to the length of the third surface S3 described above. According to another exemplary embodiment of the invention, the second stress generation portion 313c and the second portion 312 may have a width greater than the second width W2 in the second direction DR2.

Also, the inner surfaces of the first groove G1 are described as including three linear planar surfaces, but the invention is not limited thereto. In an exemplary embodiment, for example, the inner surfaces of the first groove G1 include at least one curved surface or two or four or more planar sides or surfaces. That is, according to one or more exemplary embodiment of the invention, the first groove G1 may have various shapes.

Also, according to an embodiment, the bendable portion 313 collectively includes the one stress concentration portion 313a and the two stress generation portions 313b and 313c, but the invention is not limited thereto. In another exemplary embodiment, for example, at least one of the stress generation portions 313b and 313c may be omitted in the bendable portion 313. That is, the inner surfaces forming the first groove G1 may directly include a portion of one surface of the first portion 311 (first stress generation portion 313b omitted) or a portion of one surface of the second portion 312 (second stress generation portion 313c omitted).

Figure 5:
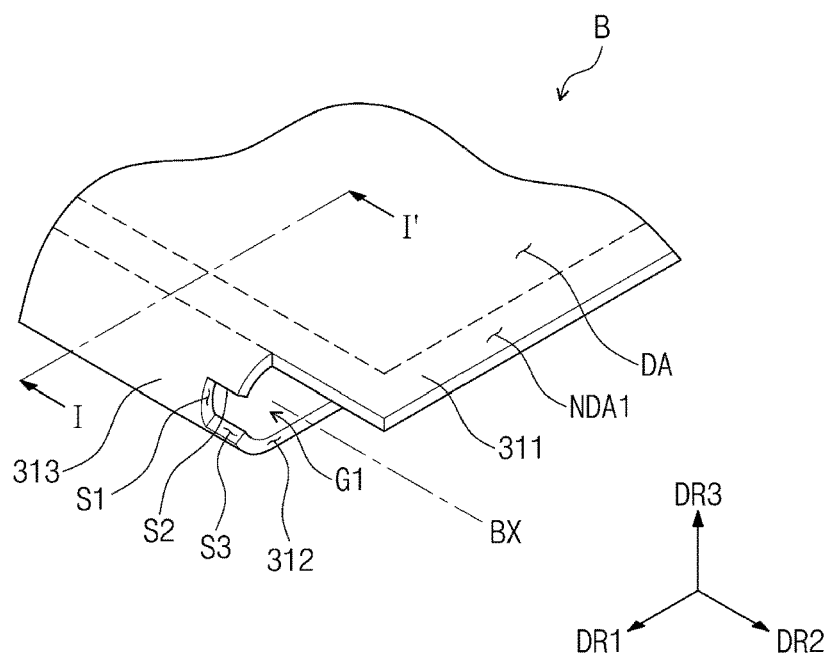
FIG. 5 is an enlarged perspective view of a region B of the display apparatus illustrated in FIG. 1.
Figure 6:
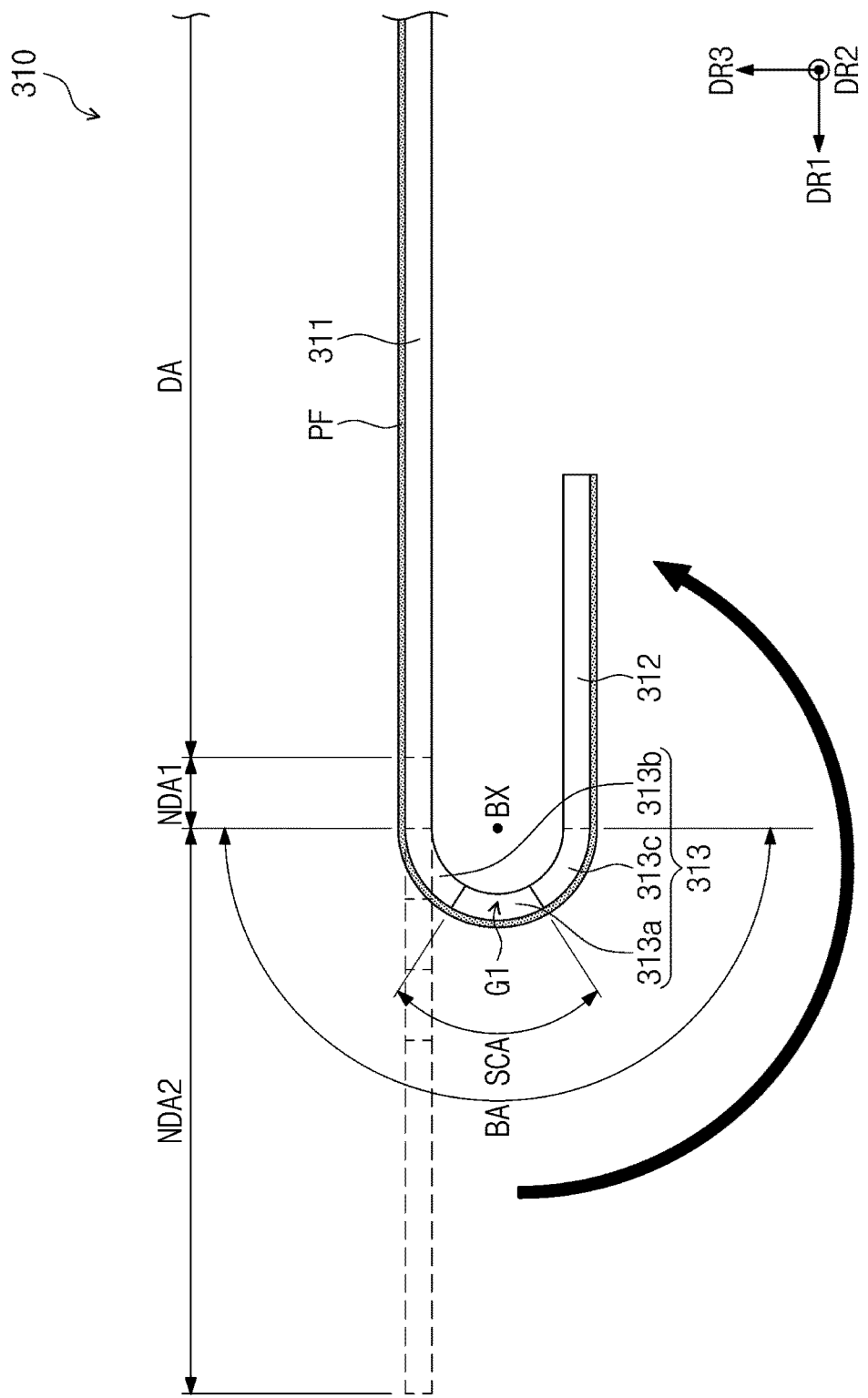
FIG. 6 is a cross-sectional view taken along line I-I' of FIG. 5.

FIG. 5 is an enlarged perspective view of a region B of the display apparatus illustrated in FIG. 1, and FIG. 6 is a cross-sectional view taken along line I-I' of FIG. 5.

Referring to FIGS. 5 and 6, the display substrate 310 further includes a protection film PF disposed on the first portion 311, the second portion 312 and the bendable portion 313 so as to overlap the first portion 311, the second portion 312 and the bendable portion 313. The protection film PF serves as protecting the pixels, constituent elements thereof or other elements at the display area DA of the display substrate 310 and the pad portion (not shown) of the second non-display area NDA2 of the display substrate 310. In another exemplary embodiment of the invention, the protection film PF may be omitted.

The bendable portion 313 may be bent from a flat (unfolded) state (dotted lines in FIG. 6) about a bending axis BX extended parallel to the second direction DR2. The stress concentration portion 313a may be aligned with the bending axis BX. The first groove G1 may be aligned with the bending axis BX, but the invention is not limited thereto. The bendable portion 313 extending in the first direction DR1 is extended in a direction opposite to the third direction DR3, to dispose a distal end of the display substrate 310 (e.g., second portion 312) extending in a direction opposite to the first direction DR1. Here, the bendable portion 313 may have a predetermined radius of curvature.

As the bendable portion 313 is bent about the bending axis BX, the second portion 312 may be disposed under the first portion 311. That is, the first portion 311 may overlap the second portion 312 and may each be disposed on a plane parallel to a plane defined by the first direction DR1 and the second direction DR2. Thus, according to an exemplary embodiment of the invention, a space occupied by a non-display area of the display device 1000 (or the display panel 300) may be reduced to reduce an overall planar size of a bezel of the display apparatus 1000.

As the bendable portion 313 is bent about the bending axis BX, stress may be applied to the bendable portion 313. The intensity of the stress applied to the bendable portion 313 is proportional to a thickness of the bendable portion 313. The thickness of the bendable portion 313 may be taken in the third direction DR3 in an unfolded state of the display substrate 310. Also, the intensity of the stress applied to the bendable portion 313 is inversely proportional to a length of the bendable portion 313 in the first direction DR1, and proportional to a width of the bendable portion in the second direction DR2.

According to an exemplary embodiment of the invention, since the bendable portion 313 collectively has the second and third widths W2 and W3 each less than the first width W1 of the first portion 311 in the second direction DR2, the intensity of stress applied to the bendable portion 313 may be reduced as compared to the bendable portion 313 having a same width such as that of the first width W1. Therefore, a phenomenon in which a crack occurs in the bendable portion 313 may be reduced or effectively prevented. That is, durability and a bending characteristic of the display substrate 310 may be improved when the bendable portion 313 has the widths according to one or more exemplary embodiment of the invention.

In addition, the intensity of the stress applied to the stress concentration portion 313a may be different from those of stresses applied to the first and second stress generation portions 313b and 313c. According to an exemplary embodiment, the intensity of the stress applied to the stress concentration portion 313a may be greater than those of stresses applied to the first and second stress generation portions 313b and 313c. Expressed in another way, with the display substrate 310 bent, the stress applied to the stress concentration portion 313a may be considered a reference value, and the stresses respectively applied to the first and second stress generation portions 313b and 313c disposed at opposing sides of the stress concentration portion 313a in the first direction is less than the reference value.

According to an exemplary embodiment of the invention, since the stress concentration portion 313a has the third width W3 less than the second width W2 of each of the first and second stress generation portions 313b and 313c in the second direction DR2, the intensity of the stress applied concentratedly to the stress concentration portion 313a may be reduced as compared to the stress concentration portion 313a and the first and second stress generation portions 313b and 313c having the same widths. Therefore, the phenomenon in which the crack occurs in the bendable portion 313 may be further reduced or effectively prevented. That is, the durability and bending characteristic of the display substrate 310 may be improved when the bendable portion 313 has the widths according to one or more exemplary embodiment of the invention.

However, the invention is not limited thereto. In another exemplary embodiment of the invention, the intensity of the stress applied to the stress concentration portion 313a may be the same as those of stresses applied to the first and second stress generation portions 313b and 313c.

Also, according to an embodiment of the invention, the length of the bendable portion 313 may be changed in the first direction DR1 depending on the radius of curvature of the bendable portion 313. Particularly, as the radius of curvature of the bendable portion 313 increases, the length of the stress concentration portion 313a of the bendable portion 313 may increase in the first direction DR1.

Figure 7:
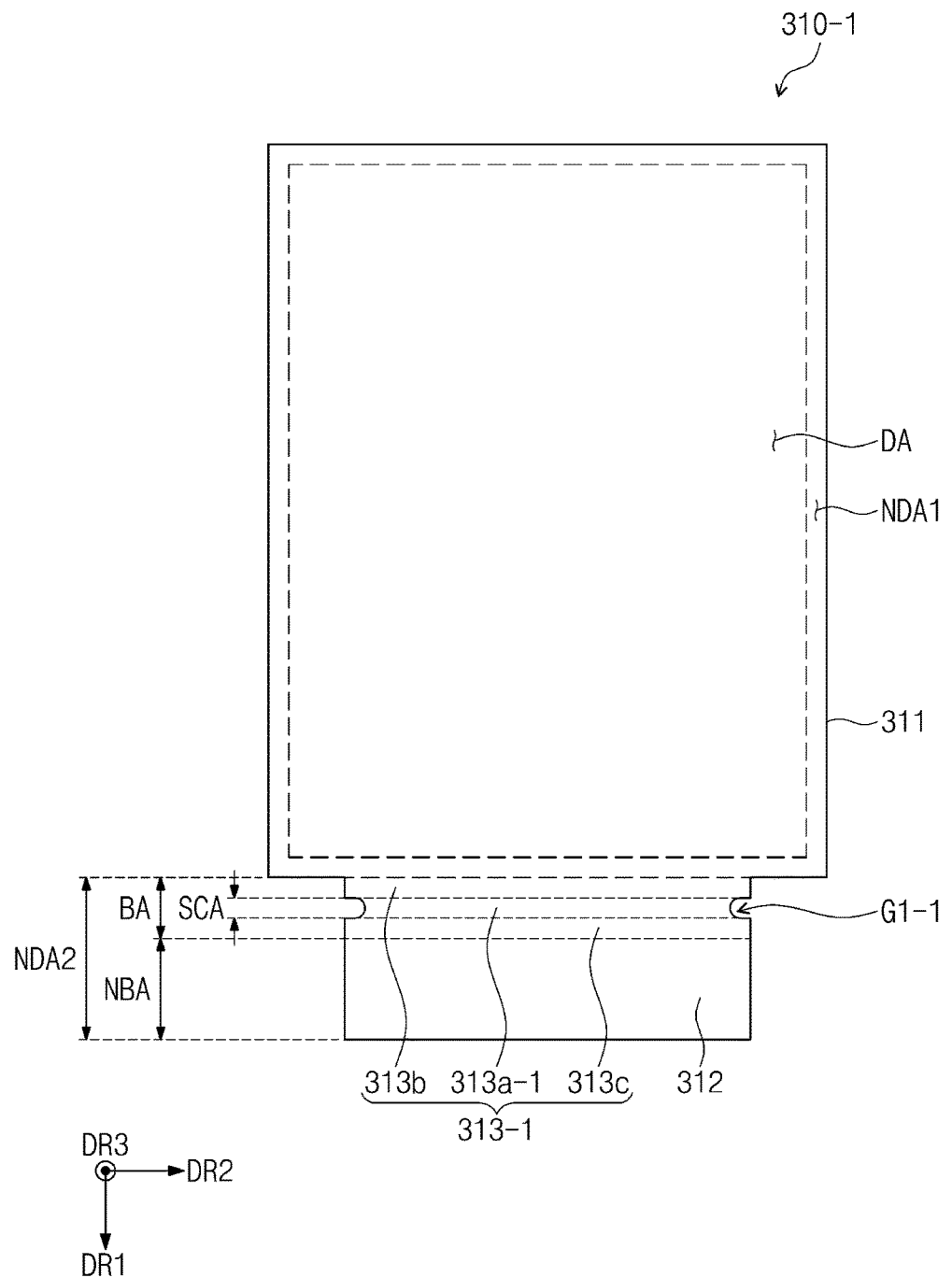
FIG. 7 is a top plan view illustrating a state in which another embodiment of a bendable portion of a display substrate is unfolded (e.g., in a flat state) according to the invention.

FIG. 7 is a top plan view illustrating a state in which another exemplary embodiment of a bendable portion of a display substrate 310-1 is unfolded according to the invention. In the description of FIG. 7, the same reference symbol is given to the same components, and duplicated descriptions with respect to the components will be omitted.

According to another exemplary embodiment of the invention in reference with FIG. 7, an inner surface of a first groove G1-1 provided on a bendable portion 313-1 may include at least one curved surface. In one exemplary embodiment, for example, the inner surface of the first groove G1-1 may have a shape of 'U'. The first groove G1-1 is disposed in the stress concentration portion 313a-1.

According to the exemplary embodiment of the invention, a possibility of occurrence of cracks may be reduced when an inner surface of a first groove G1-1 provided on the bendable portion 313-1 includes at least one curved surface. Thus, the durability and bending characteristics of the display substrate 310 may be effectively improved.

According to the embodiment, the first groove G1-1 is defined in only the stress concentration portion 313a, but is not limited thereto. Although not shown, according to another exemplary embodiment of the invention, the first groove G1-1 may be disposed at a location furthest in the first direction DR1 from the first portion 311, e.g., at a front surface of each of both side surfaces of the bendable portion 313 in the first direction DR1. Here, the inner surface of the first groove G1-1 may have a curved shape that corresponds to the intensity of the stress applied to the bendable portion 313.

Figure 8:
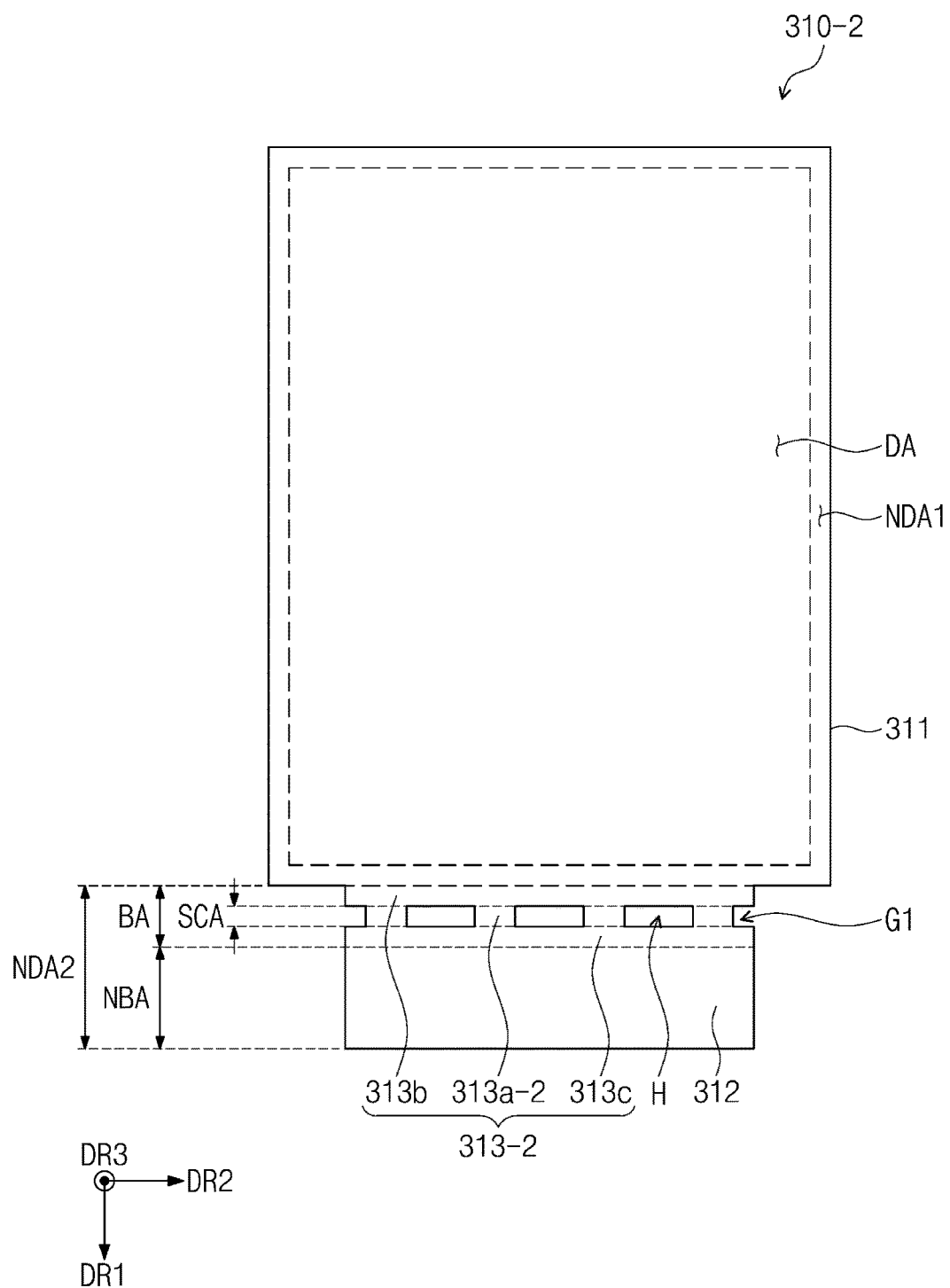
FIG. 8 is a top plan view illustrating a state in which still another embodiment of a bendable portion of a display substrate is unfolded (e.g., in a flat state) according to the invention.

FIG. 8 is a top plan view illustrating a state in which still another exemplary embodiment of a bendable portion of a display substrate 310-2 is unfolded according to the invention. In description of FIG. 8, the same reference symbol is given to the same components, and duplicated descriptions with respect to the components will be omitted.

According to another exemplary embodiment of the invention in reference with FIG. 8, a hole H may be provided in plurality in a bendable portion 313-2. The hole H may be otherwise referred to as a stress-reduction member, along with the first groove G1. The holes H are arranged in the second direction DR2 between the first grooves G1 provided at opposing side surfaces of the bendable portion 313-2. The holes H are spaced apart from each other along the second direction DR2. The holes H and the first grooves G1 are arranged in the second direction DR2. The holes H and the first grooves G1 are provided in the stress concentration portion 313a-2. The hole H may be an enclosed opening, bordered by edges of the stress concentration portion 313a-2 and of the first and second stress generation portions 313b and 313c.

According to the embodiment, when the bendable portion 313-2 including the holes H disposed in the stress concentration portion 313a-2, and the bendable portion 313-2 is bent about a bending axis at the stress concentration portion 313a-2, the intensity of the stress concentrated to the stress concentration portion 313a-2 of the bendable portion 313-2 may be reduced. That is, according to the embodiment, the durability and bending characteristic of the display substrate 310 may be effectively improved.

According to the embodiment, the plurality of holes H are provided in the stress concentration portion 313a-2, but the invention is not limited in the number of the holes H. Although not shown in the drawing, according to another embodiment of the invention, only one hole H may be provided in the stress concentration portion 313a-2.

Also, in the embodiment, the holes H are provided in only stress concentration portion 313a-2, but the invention is not limited thereto. Although not shown in the drawing, according to another embodiment of the invention, the holes H may overlap the stress concentration portion 313a and also a portion of the first and second stress generation portions 313b and 313c. In an exemplary embodiment, the hole may overlap all or a portion of the stress concentration portion 313a in the first direction DR1, and may extend from the stress concentration portion 313a into the first and/or second stress generation portions 313b and 313c.

Also, although each of the holes H has a rectangular shape in the top plan view of FIG. 8, the invention is not limited to the shape of the hole H, and the hole H having various shapes may be applied to the invention.

Figure 9:
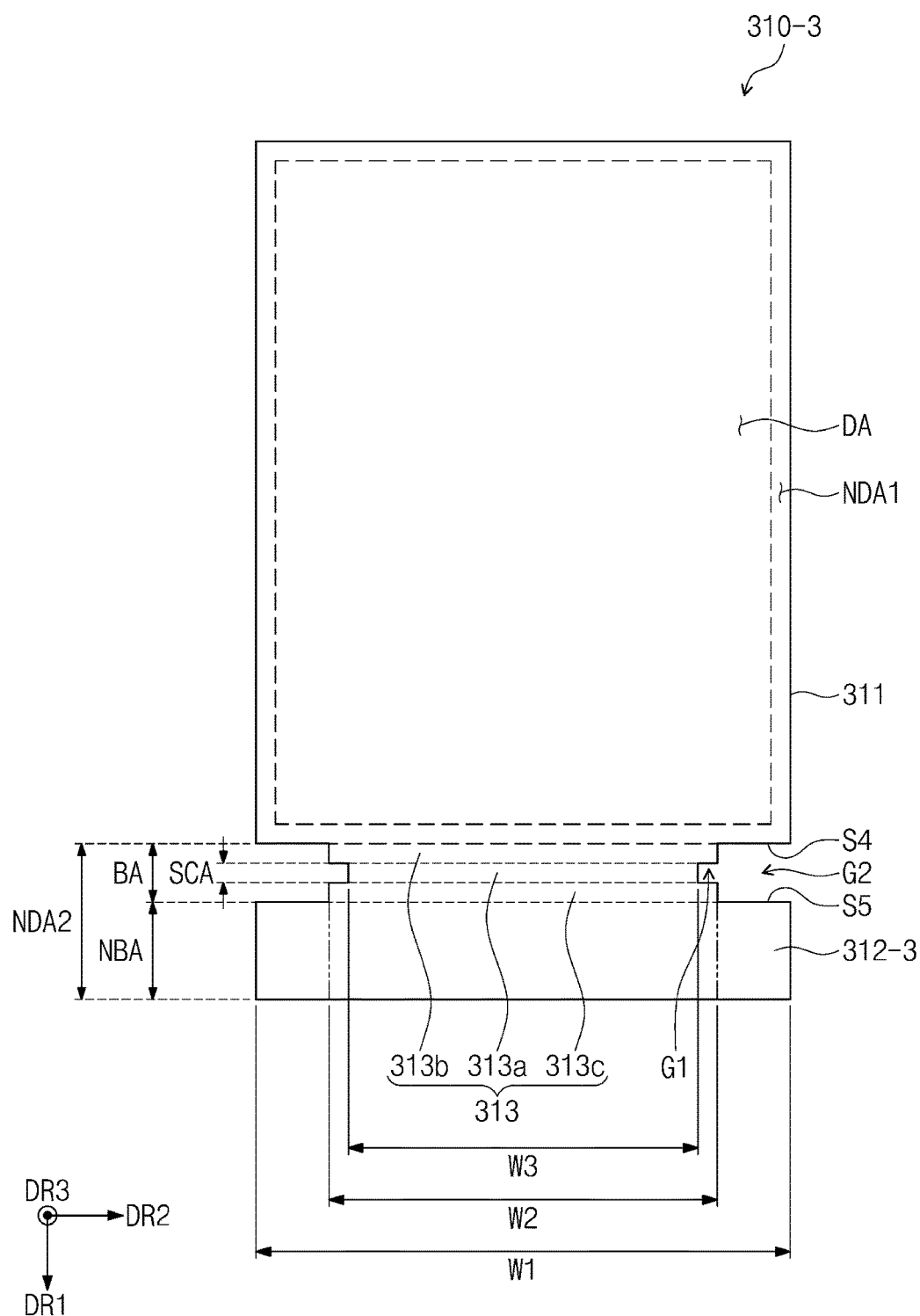
FIG. 9 is a top plan view illustrating a state in which yet another embodiment of a bendable portion of a display substrate is unfolded (e.g., in a flat state) according to the invention.

FIG. 9 is a top plan view illustrating a state in which yet another exemplary embodiment of a bendable portion of a display substrate 310-3 is unfolded according to the invention. In description of FIG. 9, the same reference symbol is given to the same components, and duplicated descriptions with respect to the components will be omitted.

According to another exemplary embodiment of the invention in reference with FIG. 9, a second portion 312-3 of the display substrate 310-3 has a fourth width (not shown) in the second direction DR2. The fourth width (not shown) is the same as the first width W1. That is, the width (not shown) of the second portion 312-3 in the second direction DR2 is same as the width of the first portion 311 in the second direction DR2. Thus, a portion of one surface of the second portion 312-3 may be exposed in the first direction DR1 by the bendable portion 313.

The embodiment of the invention is not limited to the size of the fourth width (not shown). In an exemplary embodiment, for example, according to another exemplary embodiment of the invention, the fourth width (not shown) is less than the first width W1 and greater than the third width W3.

A difference in widths of the stress concentration portion 313a, and the first and second stress generation portions 313b and 313c effectively defines the recess of the first groove G1. A second groove G2 may be defined in each of opposing surfaces of the display substrate 310-3 by the exposed portions of the one surface of the second portion 312-3, the portions of the one surface of the first portion 311 exposed in the first direction DR1 by the bendable portion 313, and the both surfaces of the bendable portion 313 in the second direction DR2. A difference in widths of the second portion 312-3 and the bendable portion 313 effectively defines the recess of the second groove G2.

As the bendable portion 313 has the second and third widths W2 and W3 less than the first width W1 of each of the first portion 311 and the second portion 312-3, a plurality of grooves G2 may be provided at the opposing surfaces of the display substrate 310-3 in the second direction DR2.

Inner surfaces of the first groove G2 may include the one surface of the bendable portion 313 disposed furthest in the second direction DR2 (e.g., the two vertical surfaces of the bendable portion 313 at either side of the first groove G1), a fourth surface S4 defined common with the portion of the one surface of the first portion 311 exposed by the bendable portion 313, and a fifth surface S5 defined common with the portion of the one surface of the second portion 312-3 exposed by the bendable portion 313. Here, the fourth surface S4 and the fifth surface S5 face each other in parallel, and the one surface of the bendable portion 313 effectively connects the fourth surface S4 and the fifth surface S5 to each other.

According to the embodiment, the inner surfaces of the second groove G2 include three surfaces, but the invention is not limited to the shape of the second groove G2, and the groove G2 having various shapes may be applied to the embodiment of the invention.

Figure 10A:
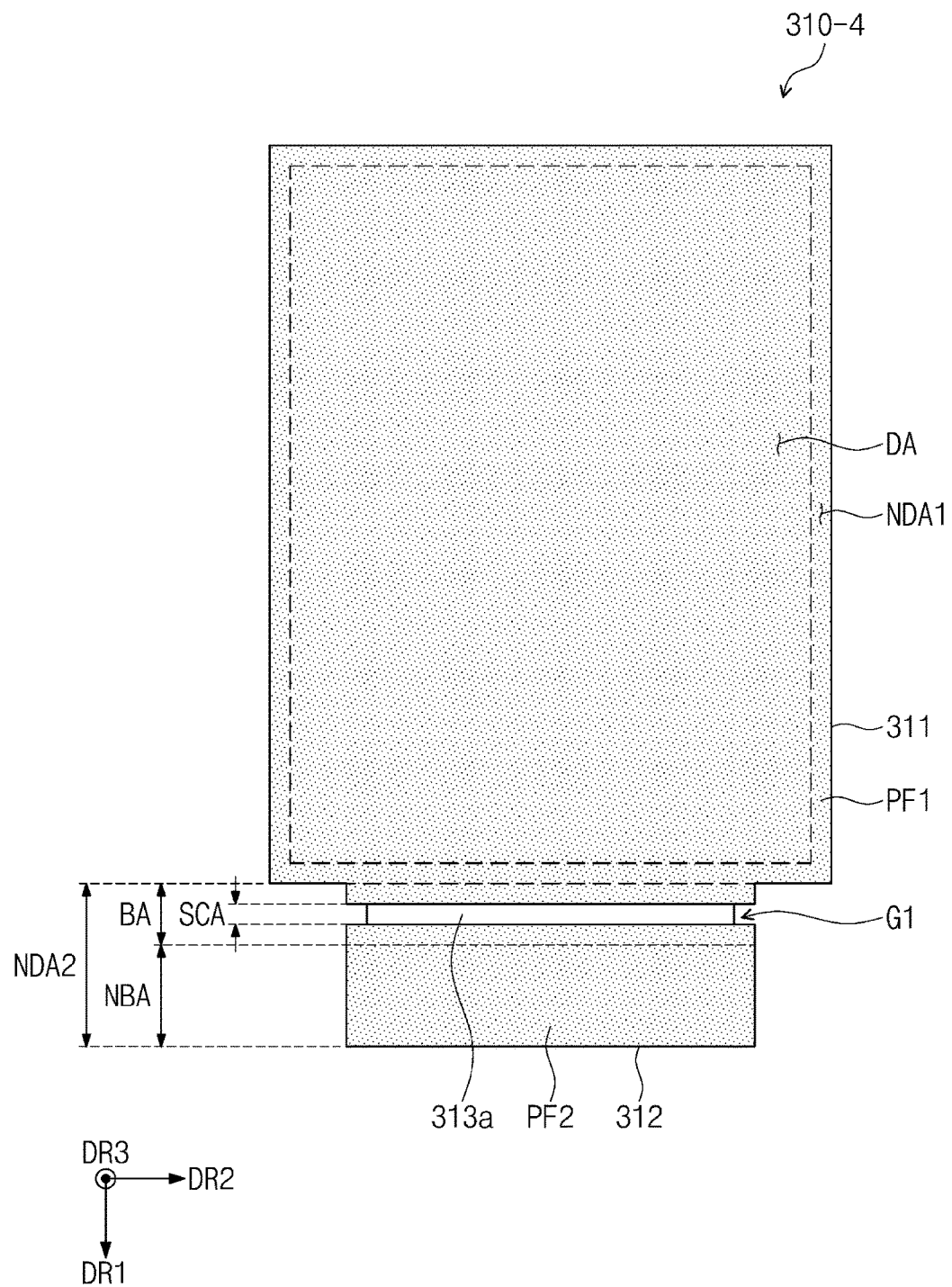
FIG. 10A is a top plan view illustrating a state in which yet another embodiment of a bendable portion of a display substrate is unfolded (e.g., in a flat state) according to the invention.
Figure 10B:
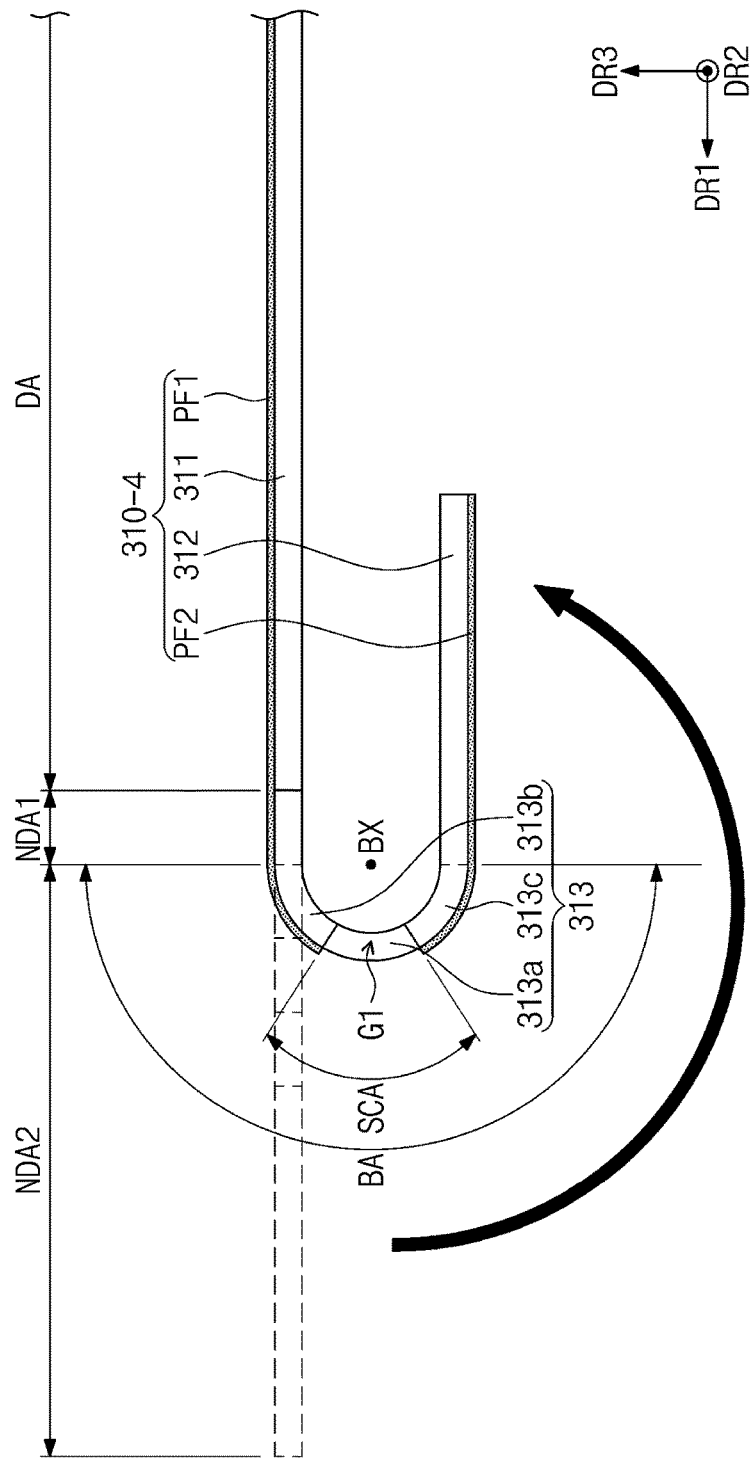
FIG. 10B is a cross-sectional view of the display substrate illustrated in FIG. 10A.

FIG. 10A is a top plan view illustrating a state in which yet another exemplary embodiment of a bendable portion of a display substrate 310-4 is unfolded according to the invention, and FIG. 10B is a cross-sectional view of a bent state of the display substrate 310-4 illustrated in FIG. 10A. The bent state may be similarly taken to FIG. 5 at the region B of the display apparatus illustrated in FIG. 1, and the cross-sectional view may be taken similarly to FIG. 6 along line I-I' in FIG. 5. In description of FIGS. 10A and 10B, the same reference symbol is given to the same components, and duplicated descriptions with respect to the components will be omitted.

Referring to FIGS. 10A and 10B, a display substrate 310-4 according to another embodiment of the invention may further include a first protection film PF1 and a second protection film PF2.

The first protection film PF1 is commonly disposed on the first portion 311 and the first stress generation portion 313b so as to overlap the first portion 311 and the first stress generation portion 313b.

The second protection film PF2 is commonly disposed on the second portion 312 and the second stress generation portion 313c to overlap the second portion 312 and the second stress generation portion 313c.

The first protection film PF1 and the second protection film PF2 are spaced apart from each other along the first direction DR1 of the unfolded display substrate 310-4. That is, the first protection film PF1 or the second protection film PF2 is not disposed on the stress concentration portion 313a and defines a gap therebetween in the first direction DR1. Thus, a top surface of the stress concentration portion 313a may be exposed between the first protection film PF1 and the second protection film PF2. The gap between the first protection film PF1 and the second protection film PF2 may also be referred to as a stress-reduction member, along with grooves and holes described above.

According to an embodiment, since a total thickness at the stress concentration portion 313a of the bendable portion 313 is less than those at the first portion 311, the second portion 312, the first stress generation portion 313b and the second stress generation portion 313c, owing to the first protection film PF1 and the second protection film PF2, the intensity of the stress applied to the stress concentration portion 313a may be reduced. Therefore, the phenomenon in which the crack occurs in the bendable portion 313 may be prevented. That is, the durability and bending characteristic of the display substrate 310-4 may be improved.

However, the invention is not limited thereto. Although not shown in the drawing, according to another embodiment of the invention, the first protection film PF1 is disposed on the first portion 311, but may be not disposed on the first stress generation portion 313b adjacent thereto. The second protection film PF2 is disposed on the second portion 312, but may be not disposed on the second stress generation portion 313c adjacent thereto. That is, the bendable portion 313 may be entirely exposed between the first protection film PF1 and the second protection film PF2 in the first direction DR1.

Figure 11:
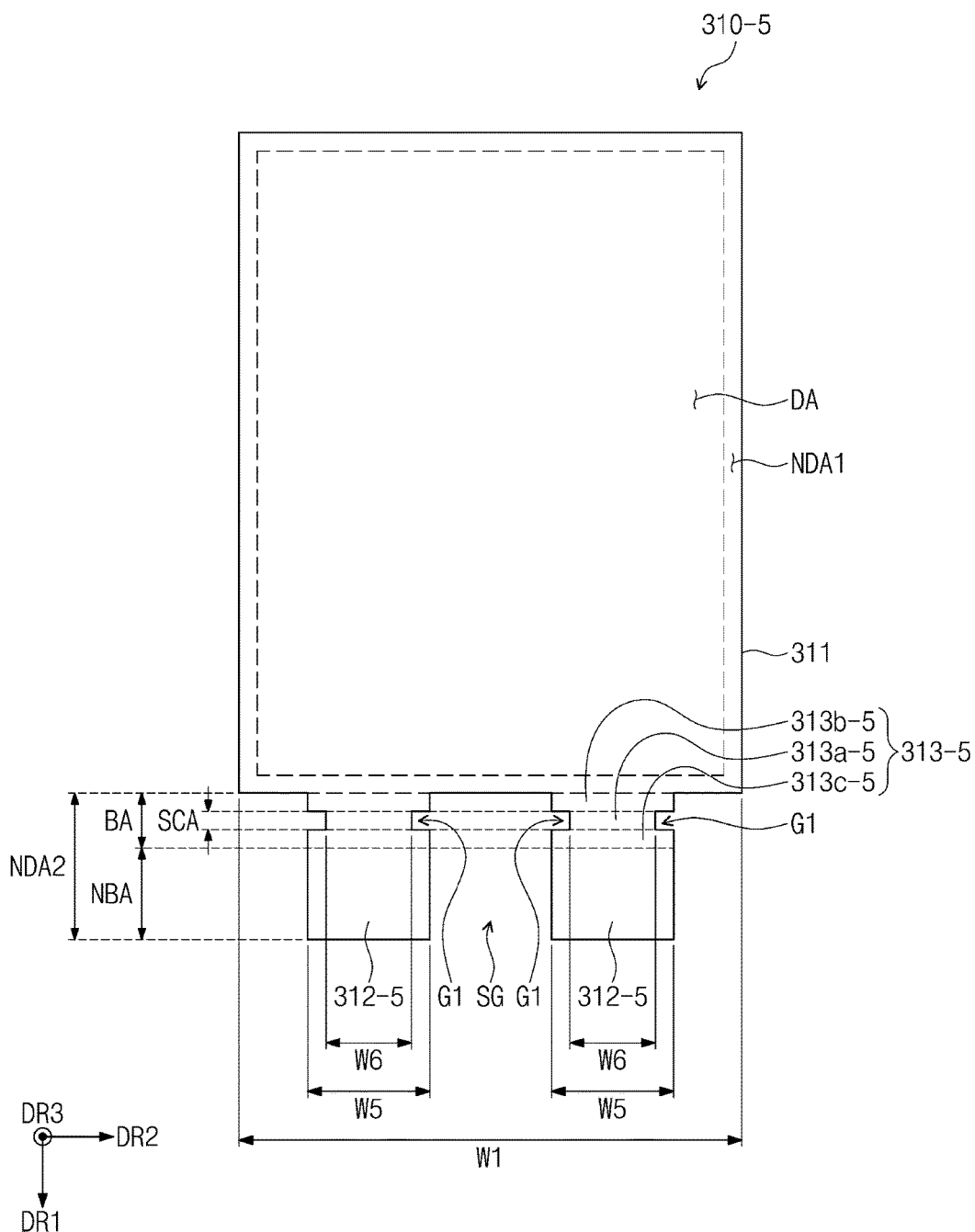
FIG. 11 is a top plan view illustrating a state in which yet another embodiment of a bendable portion of a display substrate is unfolded (e.g., in a flat state) according to the invention.

FIG. 11 is a view illustrating a state in which yet another exemplary embodiment of a bendable portion of a display substrate 310-5 is unfolded according to the invention. In description of FIG. 11, the same reference symbol is given to the same components, and duplicated descriptions with respect to the components will be omitted.

Referring to FIG. 11, a collective second non-display area NDA2 includes a second portion 312-5 provided in plural and a bendable portion 313-5 provided in plurality. The plurality of second portions 312-5 are connected to the plurality of bendable portions 313-5 in one-to-one correspondence. The bendable portions 313-5 connected to the second portions 312-5 are connected to the first portion 311 in the first direction DR1. A same first portion 311 is common to the second non-display area NDA2 as including each of the second portion 312-5 and the bendable portion 313-5 provided in plurality.

Each of a first stress generation portion 313b-5 and a second stress generation portion 313c-5 of each of the bendable portions 313-5 has a fifth width W5 in the second direction DR2. A stress concentration portion 313a-5 of each of the bendable portions 313-5 has a sixth width W6 in the second direction DR2. Each of the second portions 312-5 has a seventh width (not shown) in the second direction DR2.

According to the embodiment, the sum of widths of the first stress generation portions 313b-5 and the sum of the widths of the second stress generation portions 313c-5 in the second direction DR2 may each be less than the first width W1. The bendable portions 313-5 and the second portions 312-5 are arranged to be respectively spaced apart from each other in the second direction DR2. A spacing groove SG may be defined between the bendable portions 313-5 and the second portions 312-5. The spacing groove GS may have a shape recessed from one surface of the second portion 312-5 toward the first portion 311. The one surface of the second portion 312-5 from which the spacing groove GS is recessed, may be considered a distal end of the display substrate 310-5.

In an exemplary embodiment, for example, in FIG. 11, the two second portions 312-5 and the two bendable portions 313-5 are illustrated, and the one spacing groove SG defined therebetween is illustrated. However, the invention is not limited thereto. More than one spacing groove SG may be defined.

Also, according to an embodiment, the sixth width W6 may be less than the fifth width W5. That is, each of the stress concentration portions 313a-5 has a width less than that of each of the first and second stress generation portions 313b-5 and 313c-5. Thus, the first grooves G1 may be provided in both of opposing sides of each of the bendable portions 313-5. The first holes G1 are arranged in the second direction DR2.

According to the embodiment, the first grooves G1 are provided at inner surfaces of the bendable portions 313-5 at the spacing groove SG, but are not limited thereto. According to another exemplary embodiment of the invention, the first grooves G1 may be provided in only outer surfaces of each of two bendable portion 313-5, which are disposed at the outermost sides thereof in the second direction DR2.

According to the embodiment, a width of the bendable portions 313-5 that contributes to a bending of the display substrate 310-5 may be reduced in the second direction DR2 because the bendable portion 313-5 is provided in plurality, and the sum of widths of the plurality of bendable portions 313-5 may be less than the first width W1 as a maximum width of the display substrate 310-5. That is, the intensity of stress applied to the bendable portions 313-5 may be reduced. Thus, the phenomenon in which the crack occurs in the bent portion 313-5 is prevented to improve the durability and bending characteristic of the display substrate 310-5.

According to one or more exemplary embodiment of the invention, the durability and bending characteristics of the display panel which is bent may be improved.

Although described with reference to exemplary embodiments, it will be apparent to those skilled in the art that various modifications and variations can be made in the present disclosure without departing from the spirit and scope of the invention as defined by the appended claims. Also, the embodiments disclosed in the present disclosure are not intended to limit the scope of the present disclosure and all technical scopes within the following claims and their equivalents should be interpreted to be included in the scope of right in the present disclosure.

What is claimed is:

1. A display panel comprising:
   a substrate which is bendable, the substrate comprising a first portion including a display area of the display panel in which a plurality of display pixels are disposed; and
   the substrate extending in a first direction from the first portion to define each of:
      a second portion of the substrate disposed adjacent to the first portion in the first direction; and
      a bendable portion of the substrate which connects the first portion of the substrate to the second portion of the substrate, and at which the display panel is bendable about a bending axis extending in a second direction which crosses to the first direction,
   wherein
   the display panel bent about the bending axis defines within the bendable portion:
      a stress concentration portion of the substrate to which a stress is applied; and
      first and second stress generation portions of the substrate disposed at opposing sides of the stress concentration portion in the first direction, and to which stress is applied less than that applied to the stress concentration portion,
   the first portion of the substrate defines a first width in the second direction,
   each of the first and second stress generation portions of the substrate defines a second width in the second direction,
   the stress concentration portion of the substrate defines a third width in the second direction, and
   the third width is less than the second width, and the second width is less than the first width.

2. The display panel of claim 1, further comprising a pad portion disposed on the second portion and connected to the plurality of display pixels of the first portion.

3. The display panel of claim 1, wherein with the display panel bent about the bending axis, the second portion overlaps the first portion.

4. The display panel of claim 1, wherein
   the display panel bent about the bending axis defines a radius of curvature of the bendable portion, and
   a length of the stress concentration portion of the bendable portion in the first direction is proportional to the radius of curvature of the bendable portion.

5. The display panel of claim 1, wherein the stress concentration portion of the bendable portion includes an enclosed hole.

6. The display panel of claim 1, wherein
the second portion defines a fourth width in the second direction, and
the fourth width is greater than or equal to the second width defined by the each of the first and second stress generation portions.

7. The display panel of claim 1, wherein
the second portion defines a fourth width in the second direction, and
the fourth width is less than or equal to the second width defined by the each of the first and second stress generation portions and is greater than the third width.

8. The display panel of claim 1, further comprising:
a first protection film disposed on the first portion to overlap the first portion; and
a second protection film disposed on the second portion to overlap the second portion and spaced apart from the first protection film in the first direction,
wherein the bendable portion is exposed between the first protection film and the second protection film spaced apart from each other in the first direction.

9. The display panel of claim 1, wherein
the first stress generation portion is between the first portion and the stress concentration portion, and
the second stress generation portion is between the second portion and the stress concentration portion
further comprising:
a first protection film commonly disposed on the first portion and the first stress generation portion; and
a second protection film commonly disposed on the second portion and the second stress generation portion, and spaced apart from the first protection film in the first direction,
wherein the stress concentration portion is exposed between the first protection film and the second protection film spaced apart from each other in the first direction.

10. The display panel of claim 1, wherein
the second portion and the bendable portion are each provided in plurality,
the plurality of second portions are spaced apart from each other in the second direction and connected to the plurality of bendable portions in one-to-one correspondence in the first direction,
a sum of widths of the plurality of bendable portions in the second direction spaced apart from each other in the second direction is less than the first width defined by the first portion, and
within each bendable portion spaced apart from each other in the second direction, a width of the stress concentration portion in the second direction is less than that of each of the first and second stress generation portions in the second direction.

11. A display panel comprising:
a substrate which is bendable, the substrate comprising a first portion including a display area in which a plurality of display pixels are disposed; and
the substrate extending in a first direction from the first portion to define each of:
a second portion of the substrate disposed adjacent to the first portion in a first direction; and
a bendable portion of the substrate which connects the first portion of the substrate to the second portion of the substrate, and at which the display panel is bendable about a bending axis extending in a second direction which crosses the first direction,
wherein
the display panel bent about the bending axis defines within the bendable portion:
a stress concentration portion of the substrate to which a stress is applied; and
first and second stress generation portions of the substrate disposed at opposing sides of the stress concentration portion in the first direction, and to which stress is applied less than that applied to the stress concentration portion,
the first portion of the substrate defines a first width in the second direction,
each of the first and second stress generation portions of the substrate defines a second width less than the first width in the second direction, and
the bendable portion of the substrate is provided with a stress-reducing member of the substrate, the stress-reducing member including a first groove defined in the substrate to be recessed from each of opposing side surfaces of the substrate at the stress concentration portion thereof in the second direction.

12. The display panel of claim 11, wherein an inner surface of each of the first grooves comprises a curved surface.

13. The display panel of claim 11, wherein
the stress-reducing member further includes a hole defined in the bendable portion and provided between the first grooves in the stress concentration portion, and
the first grooves and the hole are arranged in the second direction.

14. The display panel of claim 11, wherein the second portion has a fourth width greater than or equal to the second width in the second direction.

15. The display panel of claim 11, further comprising a spacing groove recessed from a distal end of the second portion and toward the first portion in the first direction,
wherein the spacing groove extends from the distal end of the second portion, passes through the second portion and passes through the bendable portion to expose a side surface of the first portion at the spacing groove.

16. The display panel of claim 15, wherein
the first grooves are provided recessed from each of opposing outer side surfaces of the stress concentration portion in the second direction,
inner side surfaces of the stress concentration portion face each other across the spacing groove,
a plurality of second grooves are respectively defined at the inner side surfaces of the stress concentration portion at the spacing groove, and
each of the second grooves at the inner side surfaces of the stress concentration portion is arranged in the second direction to face the first grooves at a respective outer side surface of the stress concentration portion.

17. A display apparatus comprising:
a window member to which an image is provided and through which the image is viewable; and
a display panel which generates and displays the image, and provides the image to the window member,
wherein
the display panel comprises:
a substrate which is bendable, the substrate comprising a first portion including a display area in which a plurality of display pixels are disposed; and
the substrate extending in a first direction from the first portion to define each of:
a second portion of the substrate disposed adjacent to the first portion in a first direction; and a bendable portion of the substrate which connects the first portion of the substrate to the second portion of the substrate and at which the display panel is bendable about a bending axis extending in a second direction which crosses the first direction, the display panel bent about the bending axis defines within the bendable portion:
  a stress concentration portion of the substrate to which a stress is applied; and
  first and second stress generation portions of the substrate disposed at opposing sides of the stress concentration portion in the first direction, and to which stress is applied less than that applied to the stress concentration portion, the first portion of the substrate defines a first width in the second direction, each of the first and second stress generation portions of the substrate defines a second width in the second direction, the stress concentration portion of the substrate defines a third width in the second direction, and the third width is less than the second width, and the second width is less than the first width.

18. The display apparatus of claim 17, further comprising a pad portion disposed on the second portion and connected to the plurality of display pixels of the first portion.

19. The display apparatus of claim 18, further comprising a printed circuit board disposed under the display panel and electrically connected to the pad portion disposed on the second portion and connected to the plurality of display pixels of the first portion.

20. A method of forming a display panel of a display apparatus, comprising:
  preparing a display panel which generates and displays an image, the display panel comprising:
    a substrate including a display area in which a plurality of display pixels are disposed;
    the substrate extending in a first direction from the display area to define each of:
      a first non-display area of the substrate disposed adjacent to the display area, and
      a second non-display area of the substrate opposite to the display area thereof in the first direction with respect to the first non-display area; and
    further defining for the second non-display area of the substrate:
      a bendable portion of the substrate at which the display panel is bent about a bending axis extending in a second direction which crosses to the first direction; and
      a non-bending portion of the substrate at which the display panel is not bent, the bendable portion disposed between the non-bending portion and the first non-display area of the substrate in the first direction;

wherein a first width is defined as a total width of the display area of the substrate and the first non-display area of the substrate which is disposed adjacent to the display area, in the second direction; and a second width is defined as a total width of the bendable portion of the second non-display area of the substrate, in the second direction;

the display panel bent about the bending axis defines within the bendable portion, a stress concentration portion of the substrate which is aligned with the bending axis in the first direction, a third width is defined as a total width of the stress concentration portion of the substrate which is aligned with the bending axis, in the second direction, and the third width is less than each of the first width and the second width, in the second direction.

* * * * *